Figure 1:
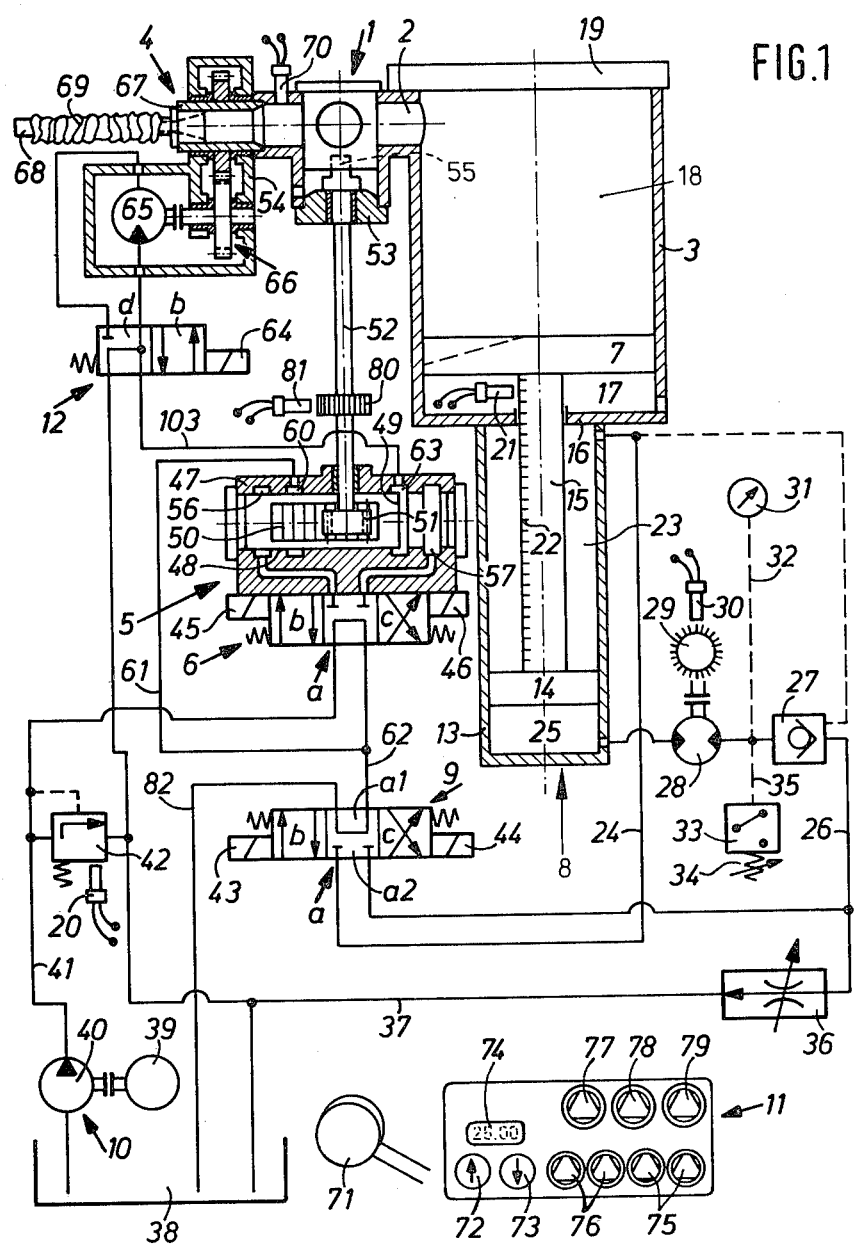

United States Patent [19]

Müller et al.

[11] 4,451,954
[45] Jun. 5, 1984

[54] APPARATUS FOR CONSECUTIVELY METERING DISCRETE AMOUNTS OF A DIVISIBLE MASS, PARTICULARLY SAUSAGE-MEAT

[75] Inventors: Johann Müller, Biberach; Georg Staudenrausch, Rissegg, both of Fed. Rep. of Germany

[73] Assignee: Albert Handtmann GmbH & Co., Biberach, Fed. Rep. of Germany

[21] Appl. No.: 336,382

[22] PCT Filed: May 15, 1981

[86] PCT No.: PCT/DE81/00072
§ 371 Date: Dec. 29, 1981
§ 102(e) Date: Dec. 29, 1981

[87] PCT Pub. No.: WO81/03259
PCT Pub. Date: Nov. 26, 1981

[30] Foreign Application Priority Data
May 16, 1980 [DE] Fed. Rep. of Germany ....... 3018793

[51] Int. Cl.³ .............................................. A22C 11/06
[52] U.S. Cl. ........................................... 17/39; 17/33; 222/18
[58] Field of Search ................. 222/20, 18; 17/33, 39, 17/40

[56] References Cited
U.S. PATENT DOCUMENTS 3,207,367 9/1965 Anderson .............................. 222/18
3,207,368 9/1965 Runge .................................... 222/20
3,769,657 11/1973 Müller ..................................... 17/35
4,191,309 3/1980 Alley et al. .......................... 17/39 X Primary Examiner—Willie G. Abercrombie
Attorney, Agent, or Firm—Finnegan, Henderson, Farabow, Garrett & Dunner

[57] ABSTRACT

Apparatus for consecutively metering discrete amounts of a divisible mass, particularly sausage meat, including feeding means (7, 96) for said mass adapted to be operated in time with the metering operation and followed by a power-operated cutoff device, the control element (6) of which is adapted to be controlled by a measuring device (28, 29, 30) also effective to control the control element (9) of the feeding means (7, 96) in proportion to the mass flowing therethrough, wherein positive control and coordination of the movements of the cutoff device (1) and the feeding means (7, 96) and substantially full utilization of the installed driving power at any moment is accomplished by providing that the control elements (6, 9) for the cutoff device (1) and the feeding means (7, 96) are actuated by one and the same fluid and are interconnected in series and/or by providing that the control element (6) for the cutoff device (1) is continually supplied with the full fluid flow from a fluid pressure source (10).

19 Claims, 5 Drawing Figures

APPARATUS FOR CONSECUTIVELY METERING DISCRETE AMOUNTS OF A DIVISIBLE MASS, PARTICULARLY SAUSAGE-MEAT

DESCRIPTION

This invention relates to apparatus for consecutively metering discrete amounts of a divisible mass, particularly sausage meat, including feeding means for said mass adapted to be actuated in time with the metering step and followed by a power-operated cutoff device, the control element of which is adapted to be controlled by a metering device also effective to control the control element of said feeding means in analog relationship to the mass flowing therethrough.

Apparatus of this type is generally employed in the field of food packaging not only for sausages and the like, but also for other pasty masses as well as ham and the like. Within the apparatus, the mass is pressurized by a stuffing pressure source, and dispensed in individual portions of substantially constant size.

Particularly suitable for stuffing or filling operations of this type are known metering pumps having metering cavities of predetermined size for volume metering. It is customary to employ piston pumps for instance of the type described in DE-PS No. 1,180,151, having a bigger feeding piston followed by a smaller metering piston performing successive metering strokes of constant magnitude. Since such pumps are effective to sealingly close the outlet, it is possible to achieve very accurate metering even at sufficiently high operating speeds, although these pumps are of a rather complicated structure.

It is further known to replace the power-operated metering piston pump by a metering valve which in most cases is arranged to be manually controlled and comprises a piston valve member adapted to be shifted between two end positions by the pressure of the mass to be metered (DE-PS No. 966,488).

Although it is also possible in this manner to achieve a certain degree of closure of the outlet, the metering accuracy is rather insufficient due to various irregularities during filling and dispensing, and in the case of stuffing sausages, the stuffing material and particularly the sausage envelope are subjected to considerable loads due to sudden pressure variations. In other metering devices such as auger pumps, rotary vane pumps and the like equipped with an intermittently operated metering element it is impossible to achieve a secure closure of the outlet. Even if the metering element is accurately stopped at predetermined positions, there will always occur an undeterminable amount of afterleaking caused by the relatively large cavities downstream of the metering element, in which the pressurized and usually elastically deformable stuffing mass is able to expand in response to pressure variations.

Apparatus of the type described in the introduction has become known from U.S. Pat. No. 3,207,368. This known metering apparatus comprises a pump for the stuffing mass operated by a hydraulic drive motor; attached to the pump shaft is a perforated disk for sensing the rotation of the pump shaft, said disk being connected to a pulse counter. Downstream of the pump there is provided a cutoff valve having a closure piston adapted to be pneumatically actuated under the control of an electromagnetic control valve itself controlled by the pulse counter. The hydraulic drive motor is controlled by an electromagnetic four-way valve likewise controlled by the pulse counter. On energizing the hydraulic motor driving the pump, the stuffing mass is displaced through the opened cutoff valve. During rotation of the pump shaft, the pulse counter counts the revolutions of the shaft; upon reaching a pre-set number of revolutions, the counter causes a counter relays contact to be closed, so that the control elements connected in parallel thereto simultaneously cause the cutoff valve to be closed by the electromagnetic control valve, and the operating fluid supply to the hydraulic motor to be interrupted by closing the associated control valve.

It is an object to improve an apparatus of the type set forth in the introduction in such a manner that a correct control and coordination of the movements of the cutoff device and of the feeding means is positively achieved and that the rated output is substantially achieved at all times.

To attain this object, the invention provides that the control elements for the cutoff device and for the feeding means are actuated by one and the same fluid and are connected in series.

Thanks to this series-connected control arrangement, the various operating steps (opening of the cutoff device, metering the mass, and closing the cutoff device) follow upon one another in a controlled manner. The feeding flow requirements are constant, so that a constant-output pump may be employed as the stuffing pressure source. A further advantage consists in avoiding the occurrence of pressure or load peaks, and in that the pressure within the system is always restricted to a value determined by the actual loads occurring during operation. This permits a high metering rate per minute to be achieved with a relatively small power input.

According to another aspect of the invention, the stated object is achieved by providing that the control element of the cutoff device in continually supplied with the fluid flow generated by a fluid pressure source.

As a result, opening and closing of the cutoff device is always performed by the full fluid flow, so that the movements of the cutoff device are carried out at maximum speed so as to enable the overall operating speed to be optimized.

In an advantageous embodiment, the invention provides that the control element of the cutoff device actuates a control piston adapted to slide within a cylinder housing between two end stops and acting as a control valve member for at least one downstream function.

The control piston is thus effective to divert the actuating fluid flow, e.g. after opening the cutoffdevice from the cylinder housing towards the feeding means, and after closing the cutoff device, from the cylinder housing towards a device to be actuated between two metering steps, in most cases a twist-off device. In this case, the fluid flow path leading to the twist-off device preferably extends through the path of the control piston in such a manner that it is open only in the closing end position of the control piston. This ensures the twist-off operation to be initiated only after the cutoff device is completely closed. Operation of the feeding means is initiated simultaneously with the opening of the cutoff device and stopped simultaneously with the closing of the cutoff device.

In order to accomplish the twist-off operation at maximum speed, the control member of the twist-off device is also supplied with the full fluid flow in the actuating position.

In a further embodiment, the invention provides that the control piston is subjected to the full fluid flow and is effective during the opening movement of the cutoff device to displace the fluid through an outlet opening of the cylinder housing into a passage leading to the feeding means. This offers the advantage that the available energy is fully utilized, so that the attainable maximum metering speed is very high.

The invention further provides that an outlet passage of the cylinder housing communicates with the passage leading to the feeding means and is isolated by the control piston from the cylinder interior supplied with the fluid flow at the beginning of the opening movement of the control piston.

The cutoff device is preferably in the form of a rotary valve, as the disequilibrated masses are then very small, permitting high cycling speeds to be attained. Moreover, the loads on structural members are kept very low, and the rotary valve can be removed from above, so that it is easily cleaned.

In a particularly simple and reliable embodiment, the feeding means comprises a stuffer piston adapted to be moved between an empty position and a full position in a stepwise motion.

The metering device for actuating the control elements for the cutoff device and the feeding means may comprise flow meters or volume meters.

In this case a flow meter may be disposed in the passage between the feeding means and the associated control element. Although in this case it is possible that a condition differential occurs at the metering location proper at the cutoff device, this differential usually lies within an insignificant magnitude. The installation of the flow meter in the manner described offers the advantage of simplicity as regards assembly and maintenance, as the operating conditions remain substantially constant at this location.

If a higher metering accuracy is required, particularly for dispensing very small portions, the volume meter or a flow meter directly responsive to the mass flowing therethrough is preferably disposed in the outlet passage of the feeding means. These sensing devices do not have to enter into direct contact with the stuffing mass, as they may be separated therefrom by a flexible diaphragm or even by a rigid wall member for sensing the through-flowing mass without direct contact. The sensing operation may for instance be performed through magnetic induction or by means of ultrasonic vibration. In this case it is possible to determined variable factors such as density, viscosity and temperature, and in particular the actually prevailing pressure, for correcting the measuring results.

The flow meter is preferably coupled with a digital pulse generator connected to a pulse counter. The required measuring and control accuracy may then be adjusted by the reference magnitude of a pulse unit. This reference magnitude will usually be one millilitre or one gram, respectively. If, however, the portions to be dispensed are very small, an even smaller value may be employed.

In a further embodiment of the invention, the control elements are connected to a metering selector determining the desired portion size, and to comparator means effective to continually compare the desired portion size to the actual portion size, so as to control the closing movement of the cutoff device in response to the result of the comparison. The control operation will then usually be in the form of a conventional closing command signal, it is also possible, however, to control the cutoff device and the dispensing operation in adifferent manner to be discussed later.

Of particular importance for the metering accuracy may be the employ of reset means effective to reset the metering device preparatory to metering the next portion as soon as the metered value attains the preset value of a portion. Although in this case the closing step itself is still delayed with respect to the reset step, it is in practice only the first portion which is inaccurately metered, while the effectively metered amount in the subsequent metering operations is equal to the preset value. This is because the amount metered between the closing command signal and the actual closing of the cutoff device is added to the subsequently metered portion. During metering of this subsequent portion, the closing command signal is already generated after metering the preset amount minus the amount metered during the preceding cycle subsequent to generation of the respective clsing command signal.

If for instance the amount to be dispensed equals 20 units, the closing command signal for the first portion is generated after 20 metered units. If the subsequently dispensed amount then amounts to 5 units, these units are already counted for the subsequent portion, so that the disponsing operation proper starts at the count of 6 units for this portion. The next closing command signal is then again generated at a count of 20 units, i.e. after 15 additional units have been metered. Together with the 5 units metered previously between generation of the closing command signal and the actual closing of the cutoff device, the total again amounts to 20 units.

A particular embodiment of the invention is characterized by control means for limiting the opening cross-section of the cutoff device. Such opening means may include an opening sensor for sensing the actual opening width of the cutoff device, and means for controlling the opening width.

The opening sensor may for instance include a pulse generator operatively connected to a digital counter effective to stop the opening movement of the cutoff device as the pulse count reaches a preset value.

In this manner it is possible to reduce the amount dispensed per time unit in the case of smaller portions, in order to achieve a higher metering accuracy. On the other hand, control in response to the locally prevailing stuffing pressure permits this pressure to be maintained above a predetermined value, so that it is not subjected to excessive variations during the metering operation.

There may further be provided control means for controlling the opening width of the cutoff device in response to a metering selector for setting the portion size and/or to a pressure sensor sensing the pressure of the stuffing mass. In this case, the opening width of the citoff device is automatically limited by the setting of the metering selector or in response to a pressure drop. For metering smaller portions it is sufficient to open the cutoff device by only a small amount. The opening degree may be controlled in such a manner, for instance by means of a pressure sensor, that the pressure of the stuffing mass in the feeding device is maintained constant.

The advantages of this embodiment of the invention reside in a rapid opening and closing operation of the cutoff device, and thus in a considerably increased output in the case of smaller portions. In the case for instance of a low-viscosity stuffing mass, the pressure within the feeding device may be maintained at a predetermined elevated level, resulting in improved metering accuracy. It is not absolutely necessary that the opening width be always the same for each metering cycle. Although it will usually be advantageous that the initial opening operation be performed as quickly and widely as possible, the closing operation may be performed more gradually, either in a continuous or in a step-wise manner. With regard to the metering accuracy it may be of importance that the flow-through velocity be decreased prior to the cutoff device being completely closed, in order to achieve a more accurate control of the dispensed amount. It is thus possible to reduce the opening width as soon as a predetermined difference between the actual amount and the preset amount of a portion is reached.

In a simplified embodiment of the invention having a fluid stuffing pressure source there is merely provided a pressure control device for controlling the feed pressure of the feeding device during the metering operations.

In this embodiment it would normally be the fluid pressure that is sensed. If, however, control of the metering accuracy is of dominant importance, it may be advantageous to provide a pressure sensor for directly sensing the stuffing pressure preferably downstream of the cutoff device. The measuring data supplied by this pressure sensor may then be used for controlling the fluid pressure itself determining the stuffing pressure.

For indicating the actual filling degree of the stuffing cylinder containing the stuffing piston it is generally possible to omit a separate sensor if this function is combined with the metering control function by the flow or volume meter provided therefor. In this case the digital pulse generator of the flow or volume meter may be connected to a digital processor controlling the filling degrenn indication.

Figure 2:
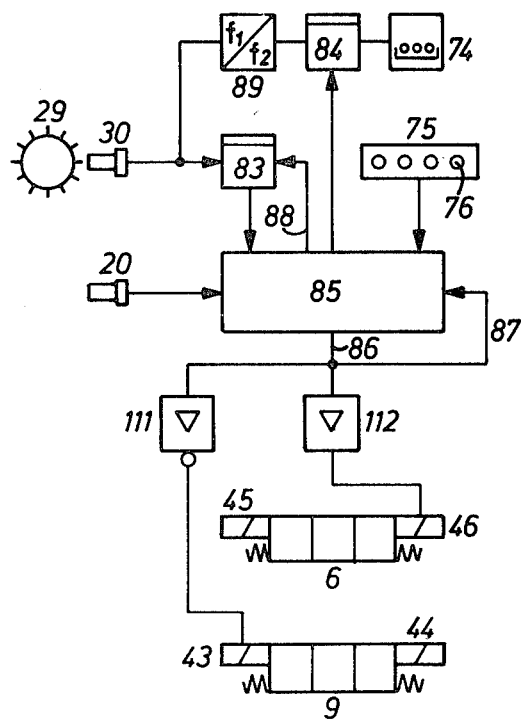
Figure 3:
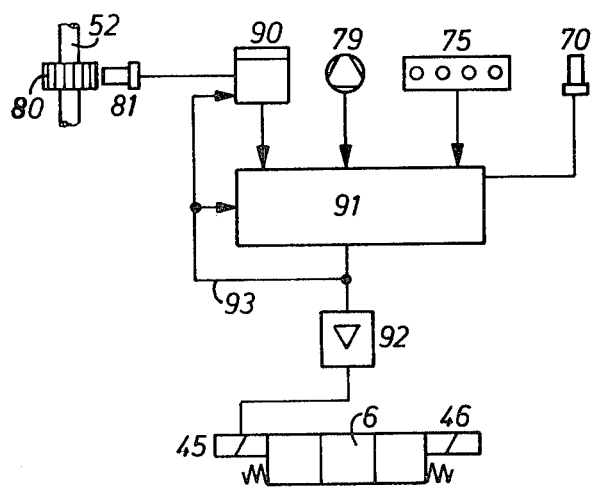
Figure 4:
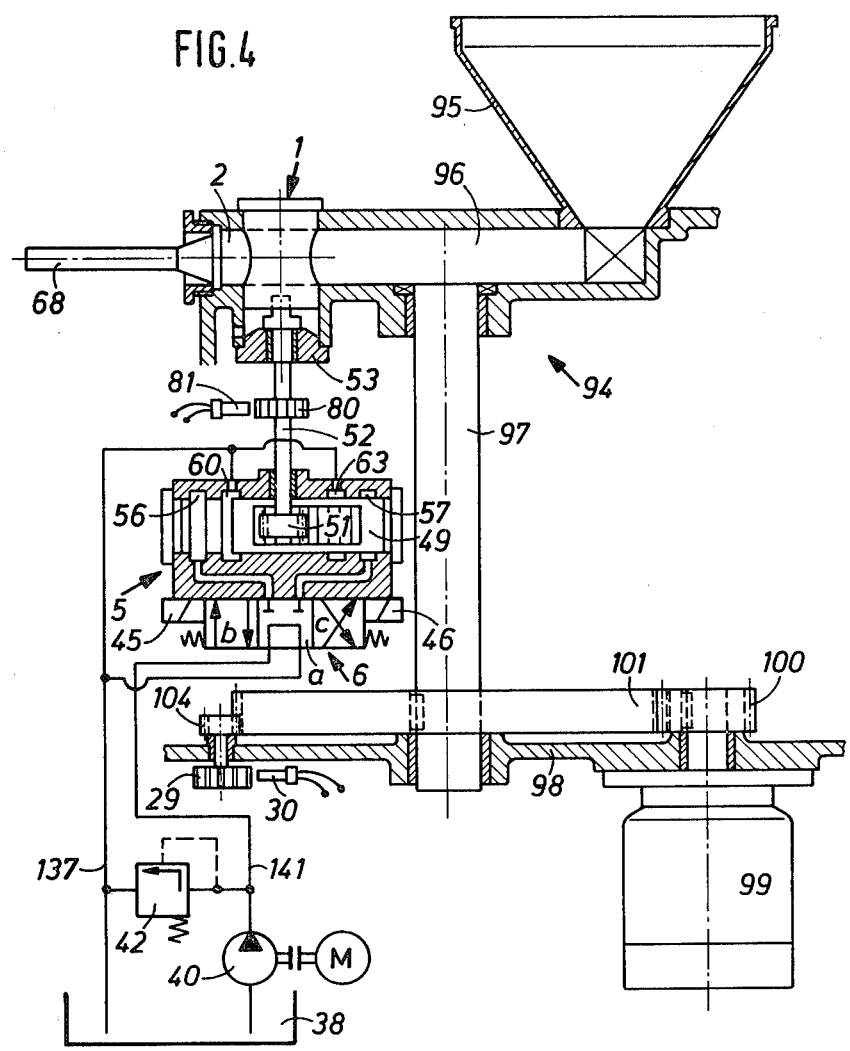
Figure 5:
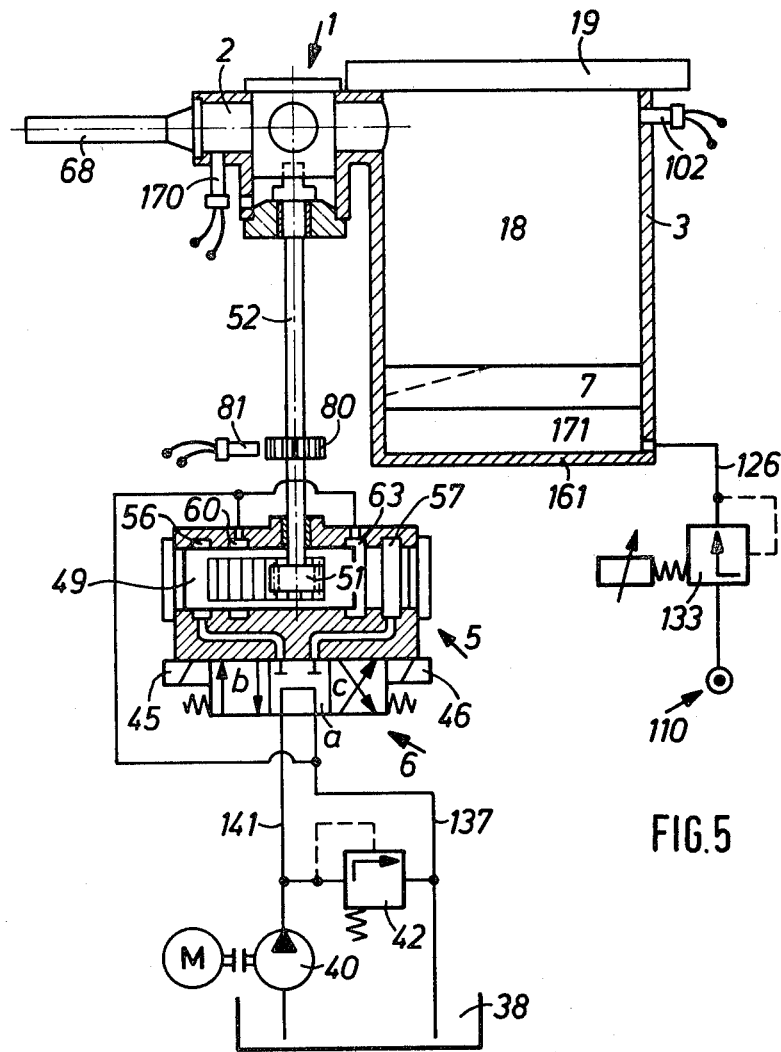

Further characteristics and advantages of the invention will become evident from the following description of embodiments with reference to the accompanying drawings, wherein:

FIG. 1 shows a circuit diagram of an embodiment of the invention having a hydraulically actuated feeding device, FIG. 2 shows a partial circuit diagram of an embodiment of the invention including two counters controlled by a common pulse generator, and a comparator arrangement, FIG. 3 shows a further partial circuit diagram of an embodiment of the invention including a counter and a comparator arrangement for controlling the opening width of a cutoff device, FIG. 4 shows a simplified embodiment of the invention including a feeding device in the form of a rotary vane pump and a pulse generator mechanically driven thereby, and FIG. 5 shows a further simplified embodiment with exclusive control of the cutoff device.

In the embodiment of FIG. 1, a cutoff device in the form of a rotary valve 1 is disposed in an outlet duct 2 extending between a stuffing cylinder 3 and a twist-off device 4. Cutoff device 1 is actuated by a servo motor 5 in combination with a control valve 6, and a stuffing piston 7 is actuated by a drive source 8 in combination with a control valve 9, said servo motor 5 and drive source 8 being supplied with an operating fluid via a hydraulic system including a pressure fluid source 10 and a central control unit 11. A further control valve 12 is provided for controlling operation of the twist-off device 4.

Drive source 8 comprises a hydraulic cylinder 13 containing a driver piston 14, the piston rod 15 of which is connected to stuffer piston 7. The space between stuffer piston 7 and the cylinder bottom 16 communicates with atmosphere. The space 18 above piston 7 is closed by a lid 19 adapted to be opened for replenishing cylinder 3.

Cylinder bottom space 17 may contain a sensor 21 cooperating with a measuring scale 22 on piston rod 15. Scale 22 may be in the form of a so-called "Inductosyn Scale" emitting magnetic fields or the like which can be very accurately sensed.

The space 23 of hydraulic cylinder 13 above driver piston 14 is directly connected to control valve 9 via a duct 24, while a duct 26 leading from the space 25 below driver piston 14 to control valve 9 has various components connected thereto, such as a non-return valve 27 and a flow meter 28 driving a pulse generator 29 itself scanned by a pulse scanner 30. Pulse generator 29 is in the form of a star wheel the teeth of which each generate a pulse on passing pulse scanner 30. The unit 29, 30 is calibrated in such a manner that each tooth, i.e. each pulse corresponds to the displacement of 1 ml of the stuffing mass into outlet duct 2 by stuffer piston 7. If the relationship between the areas of Stuffer piston 7 and driver piston 14, is 5:1, each pulse thus corresponds to 0.2 ml hydraulic fluid entering space 25 through duct 26.

As indicated by phantom lines, a pressure gauge 31 is not necessarily connected to duct 26 by a duct 32, but may also be controlled by a pressure sensor disposed at another location. The same applies to a pressure regulator 33 having a spring-biased adjuster 34. In the embodiment shown, pressure regulator 33 is connected to duct 26 by a duct 35 drawn in phantom lines. In principle, however, it may also be connected to any suitable pressure sensor, for instance an electric sensor located at any convenient position.

Connected to duct 26 through a flow regulator 36 is a return duct 37 leading to a fluid reservoir 38 and additionally connected to control valve 12. Hydraulic fluid from reservoir 38 is fed to a pressure duct 41 by a pump 40 driven by a motor 39. Connected between pressure duct 41 and return duct 37 is a relief valve 42 in combination with a position sensor 20 adapted to stop operation of the apparatus for instance at the end positions of driver piston 14.

Control valves 6 and 9 each have a central hold section a, a lefthand straight-passage section b, and a lefthand crossover section c. They are controlled by means of solenoids 43, 44 and 45, 46, respectively, against the bias of return springs. Each hold section has two pairs of connections on opposite sides, with the connections on one side being blocked and those on the other side being short-circuited.

The servo motor 5 for cutoff device 1 comprises a cylinder housing 47, the bore 48 of which contains a longitudinally slidable actuating piston 49. A rack 50 formed on piston 49 meshes with a gear 51 of a shaft 52 extending through a cover 53 of a housing 54 of cutoff device 1 and connected to the latter through a releasable coupling 55.

The bore 48 of cylinder housing 47 is closed at both ends by end covers and is formed with two outer and two inner annular grooves in symmetric arrangement with respect to a common center plane. The two outer grooves 56, 57 are connected to associated ports 58/59 at the base of cylinder housing 47 through Z-shaped passages. The lefthand inner groove 60 is connected through a duct 61 to a duct 62 between the two control valves 6 and 9, while a further duct 103 leads from righthand inner groove 63 to the control valve 12 for twist-off device 4. The latter control valve 12 is operated by a single solenoid 64 and comprises a straight-through section b and an "off" section d for interrupting the fluif flow circuit through a twist-off motor 65 in the "off" position shown.

The drive of motor 65 is transmitted through a gear arrangement 65 in a known manner to a twist-off sleeve 67 located downstream of outlet duct 2 concentric therewith and carrying a replaceable stuffer tube 68 from which a sausage skin 69 is withdrawn during the twist-off operation. The overall twist-off device 4 is formed as a freely removable and attachable unit.

Outlet duct 2 has a sensor 70 inserted directly thereinto. Sensor 70 may be a pressure sensor for sensing the pressure immediately adjacent cutoff device 1, and may be electrically connected to pressure regulttor valve 33. Otherwide sensor 70 may be a flow meter for sensing the amount of the stuffing mass passing through outlet duct 2 in a manner similar to the operation of flow meter 28. The sensor may moreover be designed for directly indicating the flow-through amount as the sum of pulses representing predetermined amounts of the stuffing mass, so that an additional pulse generator is not required.

Control unit 11 is provided with a conventional knee-operated switch 71 for controlling the beginning and the end of stuffing operations. A push-button 72 controls the upward movement and a push-button 73 the downward movement of stuffer piston 7 for replenishment. Designated by reference numeral 74 is a supply indicator connected to either indicate the amount of the stuffing mass remaining in stuffing cylinder 3, or to indicate the amount of stuffing mass already dispensed from a charge of cylinder 3.

75 is a metering selector having rotary adjustment knobs 76 for each decade of the volumes to be metered. Metering selector 75 thus permits the metered volume to be selected between 10 and 9999 ml.

A function selector in the form of a rotary knob 77 is adjustible to select functions F=stuffing, P=metering and A=metering+off-twisting. The position of twist-off selector 78 determines the number of revolutions to be carried out for each twist-off operation. The electrical components for deenergizing the twist-off motor are not shown here for the sake of clarity.

An opening selector 79 finally serves to adjust the opening width of cutoff device 1. The opening width, i.e. the angle of rotation of cutoff device 1 is determined by the angular adjustment on shaft 52 of a star wheel 80 forming a pulse generator in combination with a sensor 81, the pulses of which are utilized for control functions to be described later.

Before discussing the details shown in FIGS. 2 and 3, operation of the apparatus shall briefly be explained with reference to FIG. 1.

In the condition shown in FIG. 1, all three control valves are in the "hold" or "off" positions, respectively, and the motor 39 of pump 40 is switched off. Actuating piston 49 is in its lefthand end position to close cutoff device 1. Stuffer piston 7 is in its lower end position, with stuffing cylinder 3 filled and lid 19 closed and locked.

Actuation of a main switch (not shown) causes motor 39 to be energized for driving pump 40 and thereby pressurizing pressure duct 41. From pressure duct 41 the fluid flows back to reservoir 38 through the short-circuit passages of control valves 6 and 9 and return duct 82 without performing any function.

Subsequently metering selector 75, twist-off selector 78 and opening selector 79 may be adjusted to select the amount to be metered, the number of revolutions of stuffing tube 68 between successive metered portions and, in a manner to be described later, the opening angle of cutoff device 1, respectively. Function selector 77 is adjusted to position A=metering+twist-off.

Actuation of knee-operated switch 71 then causes solenoids 43 and 45 to be energized for shifting control valves 6 and 9, respectively, to their straight-through positions. Pressurized fluid from duct 41 now flows through lefthand outer groove 56 for shifting actuating piston 49 to the right to open cutoff device 1. At the same time the fluid displaced by actuating piston 49 flows from port 57 through ducts 62 and 26 to the bottom space 25 of hydraulic cylinder 13. After actuating piston 49 has moved by about half of its stroke, connection is established between annular grooves 56 and 60, and from there through duct 61 to duct 62. After pressure regulator 33 has established the required operating pressure, driver piston in thus moved ubwards, causing stuffer piston 7 to also move upwards for displacing the stuffing mass contained in space 18 through the now opened cutoff device 1.

As the amount of hydraulic fluid flowing through duct 26 is in predetermined relationship to the amount of the displaced stuffing mass, flow meter 28 causes pulse generator 29, 30 to generate a signal representing this amount and to feed this signal to the electronic control unit. As soon as this signal corresponds to the value preset by the metereing selector 75, a signal is generated for stopping stuffer piston 7 and closing cutoff device 1. This signal causes solenoid 43 of control valve 9 to be deenergized, permitting the valve to be returned to the "off" position shown by the associated return spring, so that fluid communication to both spaces 23, 25 of hydraulic cylinder 13 is interrupted.

Solenoid 45 of control valve 6 may already be switched off prior to completion of metering the preset amount, whereby the associated return spring causes the valve to return to its hold position, so that the cutoff device is held in its open position. The above mentioned stop signal then causes solenoid 46 to be energized for shifting control valve 6 to the left, i.e. to its crossover position, whereby actuating piston 49 is also shifted to the left to establish fluid flow communication with control valve 12 through annular groove 63 and duct 103. The stop signal further causes solenoid 64 to be energized for shifting control valve to the left to its open position. By suitably designing the righthand end of actuating piston 49 it is possible to initiate operation of twistoff motor 65 before cutoff device 1 is completely closed. As soon as the preset number of twistoff revolutions is completed, a further control signal is generated, causing solenoid 64 to be deenergized to stop operation of twistoff motor 65, and solenoids 43 and 45 to be again energized for repeating the described cycle.

This control signal can readily be generated in such a manner that the succeeding metering cycle is initiated before the twistoff step is completely finished. In principle, however, the twistoff step and the metering step follow one another in timed relation, so that the amount of the hydraulic fluid supplied by pump 40 and controlled by pressure regulator 33 is not subjected to excessive variation.

In the embodiment of FIG. 2, pulse scanner 30 controls two digital counters 83, 84. Digital counter 83 and metering selector 75 are both connected to a comparator unit 85 effective to operate a switch 112 for energizing solenoid 46 of control valve 6, and a further switch 111 for deenergizing solenoid 43 of control valve 9 as soon as the count of digital counter 83 equals the preset value of metering selector 75. This causes the closing operation of cutoff device 1 to be controlled by crossover section c of control valve 6, and the supply of hydraulic fluid to space 25 of cylinder 13 to be interrupted by hold section a of control valve 9, thus stopping movement of stuffer piston 7. Simultaneously comparator unit 85 and digital counter 83 are reset to zero via leads 87 and 88, respectively, so that the counting operation for the following metering step begins already before dispensing of the previous portion is finished.

If for instance metering selector 75 is set to the amount "100", cutoff device 1 and stuffer piston 7 are operated until the amount of 100 ml has passed through flow meter 28 and solenoid 46 is energized. The volume escaping after closure of control valve 6 may now amount for instance to 10 ml, in which case this volume is already counted for the second portion, although it is dispensed with the first portion, resulting in a total amount of 110 ml.

On metering the second portion, as digital counter again reaches the count of 100 ml, the actual amount dispensed is only 90 ml, the second portion being brought up to 100 ml, however, by adding the previously measured escape amount of 10 ml. Any variations occurring during operation will then be compensated in the described manner for each subsequent portion.

The counting pulses supplied to digital counter 83 are similarly supplied to digital counter 84 after the latter has been set to the nominal volume of stuffing cylinder 3 by end position sensor 20 in response to positioning stuffer piston 7 in its lower end position or, alternatively, reset to zero in the upper end position of the stuffer piston. As long as end position sensor 20 remains inoperative, digital counter 84 will thus add together the dispensed metering units. In principle, the dispensed total amount may be directly indicated. In the embodiment shown, however, a transducer 89 connected between pulse sensor 30 and counter 84 converts the indication in such a manner that supply indicator 74 indicates the volume difference between the maximum volume of stuffing cylinder space 18 and the volume already displaced by raising stuffer piston 7 from its lower end position. In this manner the amount of the stuffing mass remaining in stuffing cylinder 3 is rather accurately determined.

In the embodiment of FIG. 3, each tooth of star wheel 80 supported on shaft 52 of cutoff device 1 passing sensor 81 causes a pulse to be generated, each such pulse corresponding to a predetermined opening angle of for instance 9°. A 90° rotation of cutoff device 1 between its closed and open end positions thus causes ten pulses to be transmitted to digital counter 90.

Together with opening selector 79, which is normally set to its maximum value "10", digital counter 90 is connected to a comparator circuit 91 effective to operate a switch 92 for deenergizing solenoid 45 of control valve 6 as soon as the count of counter 90 equals the value set by opening selector 79, whereupon control valve 6 is returned by its return springs to its hold position a to hold cutoff device 1 in its preset position. Digital counter 90 and comparator circuit 91 are then simultaneously reset through lead 93.

This switching step obviously also occurs in the same manner if opening selector 79 is set to a value below "10", for instance to a value of "8", "7" or "5". In this case the opening movement of cutoff device 1 is stopped at a partially opened position. This is of particular importance for metering smaller portions, in which case the available cycling time is frequently shorter than the time required for completely opening and closing the cutoff device.

The metering selector 75 may be directly coupled with comparator 91 in such a manner that any preset metering amount results in the setting of a corresponding opening angle or pulse count, respectively. The switching operation is then carried out as soon as the smaller one of the values set by selectors 79 and 75 is counted.

A further reason for limiting the opening angle may be the pressure drop occurring adjacent the cutoff device on metering soft or elastically yielding masses. This pressure drop may be automatically compensated by connecting a pressure-sensitive sensor 70 to comparator circuit 91.

In the embodiment of FIG. 4, stuffing tube 68 is rigidly attached to the end of outlet duct 2. Cutoff device 1, actuating motor 5 and control valve 6 are essentially as shown in FIG. 1, with the difference, however, that cutoff device 1 is shown in its open position. Inner annular grooves 60 and 63 are interconnected via return duct 137, and pressure duct 141 communicates with the hold section a of control valve 6.

Employed as the stuffing pressure source is a rotary vane pump 94 carrying a feed hopper 95 and having its vane rotor 96 supported by a vertical shaft 97 the lower end of which is mounted for rotation in a substantially horizontal bottom wall 98 of a pump housing. The output shaft of a motor 99 mounted on said bottom wall 98 carries a gear 100 meshing with a gear 101 keyed to shaft 97.

Gear 101 again meshes with a further gear 104 operatively connected to pulse generator 29. Each tooth of the star wheel corresponds to a small angle of rotation of gear 101 and thus of pump vane rotor 96. As the pump output is proportional to the angle of rotation, each pulse generated by pulse sensor 30 corresponds to a predetermined unit volume of the stuffing mass fed from feed hopper 95 into the outlet duct. It is thus possible to control motor 99 in proportion to the feeding operation in the same manner as shown in FIG. 2 with reference to the stuffing cylinder 3 of FIG. 1.

Motor 99 may be an electric motor, a hydraulic motor or a pneumatic motor. It may be operated with constant torque or with positively controlled torque. In place of direct control of this motor there may be provided a controllable clutch in between.

In the above described embodiment, a rough metering of the mass to be dispensed is carried out by means of an incrementally actuable feed element, such as stuffer piston 7 or vane rotor 96, while fine metering is effected by cutoff device 1. In the embodiment shown in FIG. 5, however, only cutoff device 1 is controlled as in the above described embodiments, while the stuffing mass is maintained at a substantially constant feed pressure.

The stuffing mass is contained in a space 18 of a stuffing cylinder 3 above stuffer piston 7. The cylinder 3 has a closed bottom, and the space 171 below stuffer piston 7 is directly connected to a hydraulic pressure source 110 through a pressure duct 126 incorporating a pressure regulator valve 133. The feeding pressure may be controlled with the aid of a pressure sensor 102 located in stuffing cylinder 3, and the dispensed amounts are measured with the aid of a flow meter 170 located in outlet duct 2 closely adjacent cutoff device 1. Flow meter 170 senses the dispensed amounts without direct contact and without mechanical interaction to supply—with or without the employ of a converter—a pulse count corresponding to the dispensed amount, so that a control arrangement as shown in FIG. 2 may be employed. In addition, flow meter 170 may be employed to control the digital counter 84 in FIG. 2 for indicating the amount of the remaining stuffing mass or that of the already dispensed mass.

A flow meter of the described type may operate on the basis of ultrasonic waves by measuring the time difference between emission and reception of the waves or the change in frequency of the ultrasonic wave train passing through the mass to determine the dispensed amounts. Flow meters of this type are known from the article "Verfahren zur Mengen- and DurchfluBmessung stroömender Güter" on pages 65 to 68 in No. 9, 1978 of the publicity circular of the firm of Bopp & Reuther GmbH, Mannheim, which is included herein be reference.

As in the above described embodiments, the opening width of cutoff device 1 is again controlled with the aid of star wheel 80 and sensor 81. This arrangement must not necessarily be restricted to merely limit the opening width, but may also be designed as a variable-control arrangement effective to initially establish a relatively large opening width which is then gradually reduced. This may be accomplished by employing direction-sensitive pulse sensors in place of plain pulse sensors.

The embodiments of the invention result in a very simple technical construction of a machine which may be employed for simple metering as well as for stuffing and twisting off of sausages or the like. This machine permits portions of widely variable size to be dispensed in rapid succession with at least sufficient accuracy as regards weight and/or volume. Adjustment between the smallest portion size of for instance 5 grammes and portion sizes of more than one kilogramme or even for continuous dispensing is accomplished by a single setting command. Accuracy and precision is in principle only required for the design of the cutoff device and its servo drive. The precision and operating efficiency of these components will then also determine the achievable overall operating speed. With presently available machines the achievable operating speed is up to about 600 cycles per minute. The drive energy for the function "twist-off" is derived from the fluid circuit at an instant at which no energy is required for the functions "stuffing" or "metering", respectively. This results in a relatively low power requirement and a high degree of efficiency.

In addition to the metering of sausage meat as described above, the apparatus may also be employed for metering other foods, such as ham, in which case the cutoff device is designed as a cutter assembly adapted to close the outlet duct by its cutting operation.

We claim:

1. Apparatus for consecutively metering discrete amounts of a divisible mass such as sausage meat comprising a hydraulic system, feeding means operated by pressurized fluid in said hydraulic system for feeding said mass, a power-operated cut-off device operated by pressurized fluid in said hydraulic system and operable, when open, to allow delivery of said mass by said feeding means and, when closed, to cut off delivery of said mass, means for metering the amount of mass fed by said feeding means and operable to cause said cut-off device to close, means controlling the flow of pressurized hydraulic fluid including a hydraulic cylinder and piston operable to utilize full hydraulic pressure in said system to operate said feeding means and said cut-off device, a twist-off device operable on the fed mass, said cylinder and piston being operable to actuate said twist-off device under full hydraulic pressure in said system upon closing of said cut-off device.

2. Apparatus as claimed in claim 1, including an outlet opening in said cylinder connected to said feeding means, said piston being operable to displace fluid from said cylinder to said feeding means during opening movement of said cut-off device.

3. Apparatus as claimed in claim 1, said piston being movable in opposite directions in said cylinder and operable in one direction of movement to cause said cut-off device to open and said feeding means to deliver said mass, said piston being operable when movable in the direction opposite said one direction to close said cut-off device and to direct full hydraulic pressure in said system to actuate said twist-off device.

4. Apparatus as claimed in claim 1, said cylinder having an outlet duct connected to a duct leading to said feeding means, said outlet duct being isolated from the interior of said cylinder by said piston when said cut-off device is open.

5. Apparatus as claimed in claim 1, including a volume metering device operable to cause said piston to close said cutoff device.

6. Apparatus as claimed in claim 5, including a control element for said piston, said volume metering device being connected to a duct between said feeding means and said control element.

7. Apparatus according to claim 5, said volume metering device being connected to an outlet passage of said feeding means.

8. Apparatus as claimed in claim 6, said volume metering device being provided with a digital pulse generator having an output connected to a digital counter.

9. Apparatus as claimed in claim 1, said cut-off device including a rotary valve positioned downstream of said feeding means, said feeding means including a metering piston.

10. Apparatus as claimed in claim 1, including control elements for said cut-off device and said feeding means, said control elements being connected to a metering selector operable to determine the desired portion size of mass delivered by said feeding means, and to a comparator means operable to continuously compare the desired portion size to the actual portion size of mass fed, said comparator means being operable to control the closing movement of said cut-off device in response to the result of said comparison.

11. Apparatus as claimed in claim 32, including means for resetting the metering means for metering a subsequent portion of fed mass as soon as fed mass reaches the selected portion size.

12. Apparatus as claimed in claim 1, including control means for limiting the opening width of said cut-off device.

13. Apparatus as claimed in claim 12, including an opening sensor for sensing the actual opening width of said cut-off device.

14. Apparatus as claimed in 13, said opening sensor being connected to a pulse generator operable to control a digital counter which is effective to stop opening movement of the cut-off device as the actual opening width reaches a predetermined value.

15. Apparatus as claimed in claim 12, including control means for the opening width of said cut-off device which is responsive to a volume selector for the portion size of said fed mass.

16. Apparatus as claimed in claim 12, including control means for the opening width of said cut-off device which is responsive to a pressure sensor sensing the pressure of said fed mass.

17. Apparatus as claimed in claim 1, including pressure regulator means for regulating the fed pressure of the feeding means.

18. Apparatus as claimed in claim 1, said feeding means including a stuffer cylinder, a supply indicator operable to indicate the actual supply of said mass in said stuffer cylinder, said indicator being controlled by a volume sensor of said metering means.

19. Apparatus as claimed in claim 18, including a digital pulse generator being connected to a digital processor controlling said supply indicator means.

* * * * *

UNITED STATES PATENT AND TRADEMARK OFFICE
CERTIFICATE OF CORRECTION

PATENT NO. : 4,451,954
DATED : June 5, 1984
INVENTOR(S) : Johann Muller et al.

It is certified that error appears in the above—identified patent and that said Letters Patent is hereby corrected as shown below:

Column 12, line 65 "32" should read --10--.

Signed and Sealed this

Twenty-third Day of October 1984

[SEAL]

Attest:

GERALD J. MOSSINGHOFF

Attesting Officer    Commissioner of Patents and Trademarks